United States Patent
Ahn et al.

(10) Patent No.: US 8,254,291 B2
(45) Date of Patent: Aug. 28, 2012

(54) ETHERNET DEVICE AND LANE OPERATING METHOD

(75) Inventors: Kye-hyun Ahn, Daejeon-si (KR); Seung-hwan Kim, Daejeon-si (KR); Yong-tae Kim, Daejeon-si (KR); Kyeong-eun Han, Daejeon-si (KR); Kwang-joon Kim, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 301 days.

(21) Appl. No.: 12/638,002

(22) Filed: Dec. 15, 2009

(65) Prior Publication Data

US 2010/0329112 A1 Dec. 30, 2010

(30) Foreign Application Priority Data

Jun. 26, 2009 (KR) ........................ 10-2009-0057771

(51) Int. Cl.
*H04L 12/28* (2006.01)

(52) U.S. Cl. ........................................ 370/254; 370/542
(58) Field of Classification Search .......................... None
See application file for complete search history.

(56) References Cited

U.S. PATENT DOCUMENTS

| | | | | |
|---|---|---|---|---|
| 6,598,229 | B2 * | 7/2003 | Smyth et al. | 725/107 |
| 7,305,047 | B1 * | 12/2007 | Turner | 375/316 |
| 7,352,694 | B1 * | 4/2008 | Clovis et al. | 370/217 |
| 7,363,417 | B1 * | 4/2008 | Ngai | 710/316 |
| 7,573,916 | B1 * | 8/2009 | Bechtolsheim et al. | 370/542 |
| 7,593,323 | B2 * | 9/2009 | Hiddle | 370/225 |
| 7,782,805 | B1 * | 8/2010 | Belhadj et al. | 370/300 |
| 2003/0214979 | A1 * | 11/2003 | Kang et al. | 370/535 |
| 2007/0150762 | A1 | 6/2007 | Sharma et al. | |
| 2008/0049788 | A1 * | 2/2008 | McClellan | 370/468 |
| 2008/0170586 | A1 * | 7/2008 | Huff et al. | 370/463 |
| 2009/0097389 | A1 * | 4/2009 | Diab et al. | 370/201 |
| 2010/0214906 | A9 * | 8/2010 | Diab et al. | 370/201 |
| 2010/0284486 | A1 * | 11/2010 | Kuwata | 375/295 |

* cited by examiner

*Primary Examiner* — Min Jung
(74) *Attorney, Agent, or Firm* — Ladas & Parry LLP

(57) ABSTRACT

An Ethernet device having multiple lanes and a method of operating the lanes are provided. In one general aspect, it is possible to allocate a dummy block to each of one or more lanes such that the lanes do not selectively participate in communications. In addition, on a receiving side, the dummy block can be removed from among the genuine data blocks to enable data to be decoded. In this case, an Ethernet device on a transmission side and an Ethernet device on a receiving side can exchange information of a lane to which the dummy block is allocated by use of a lane status message, and the lane status message may be based on a link fault message specified by Ethernet standards.

19 Claims, 4 Drawing Sheets

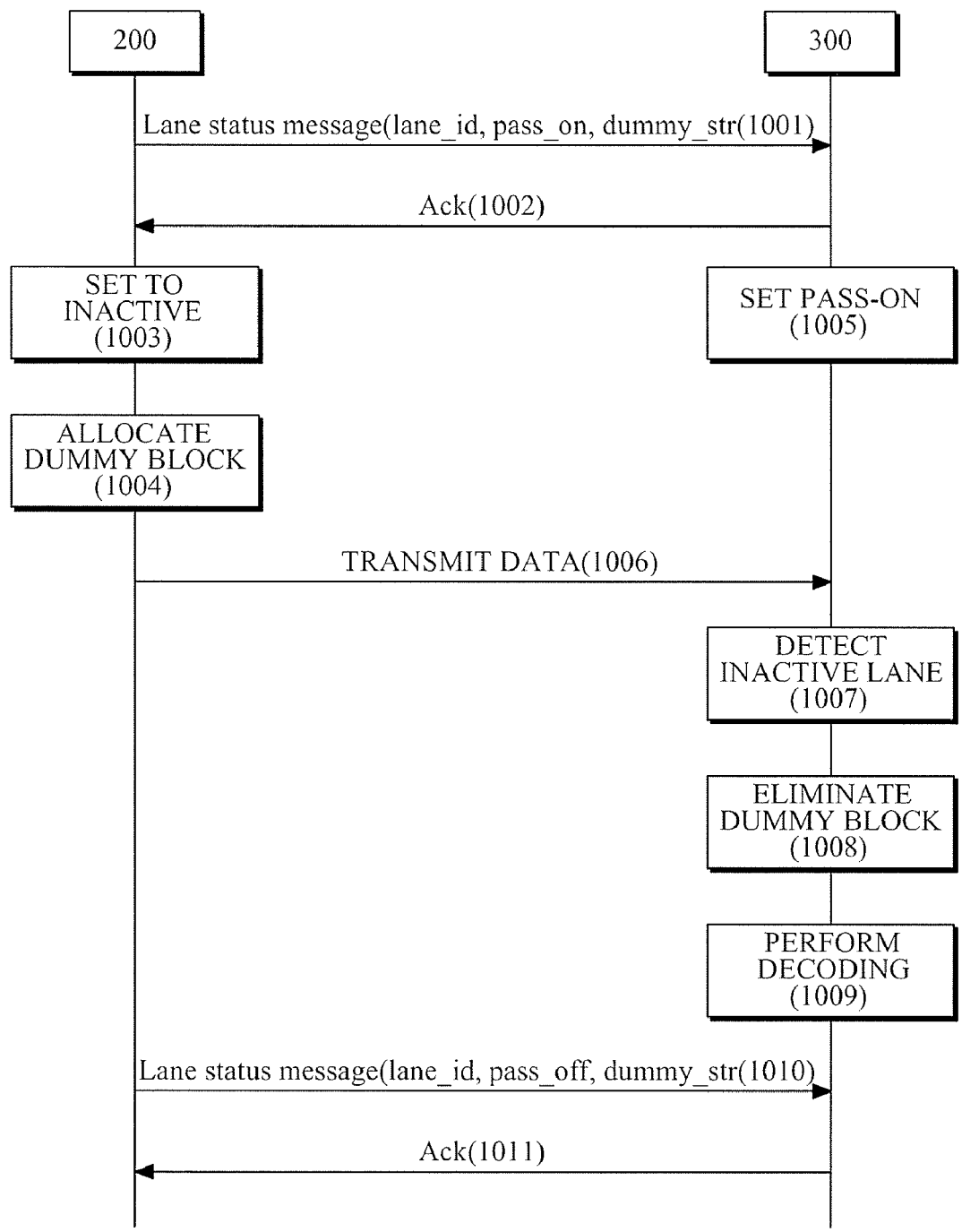

FIG.5

| Field 0 | Field 1 | Field 2 | Field 3 | Field 4 | Field 5 | Field 6 | Field 7 | Description |
|---|---|---|---|---|---|---|---|---|
| Sequence | 0x00 | 0x00 | 0x00 | 0x00 | 0x00 | 0x00 | 0x00 | Reserved |
| Sequence | 0x00 | 0x00 | 0x01 | 0x00 | 0x00 | 0x00 | 0x00 | Local Fault |
| Sequence | 0x00 | 0x00 | 0x02 | 0x00 | 0x00 | 0x00 | 0x00 | Remote Fault |
| Sequence | 0x00 | 0x00 | 0x03 | 0x00 | 0x00 | 0x00 | Lane Number | Pass On |
| Sequence | 0x00 | 0x00 | 0x04 | 0x00 | 0x00 | 0x00 | Lane Number | Pass On Ack |
| Sequence | 0x00 | 0x00 | 0x05 | 0x00 | 0x00 | 0x00 | Lane Number | Pass Start |
| Sequence | 0x00 | 0x00 | 0x06 | 0x00 | 0x00 | 0x00 | Lane Number | Pass Off |
| Sequence | 0x00 | 0x00 | 0x07 | 0x00 | 0x00 | 0x00 | Lane Number | Pass Off Ack |
| Sequence | 0x00 | 0x00 | 0x08 | 0x00 | 0x00 | 0x00 | Lane Number | Pass End |
| Sequence | 0x00 | 0x00 | 0x09 | 0x00 | 0x00 | 0x00 | Lane Number | Pass Nack |
| Sequence | ≥0x00 | ≥0x00 | ≥0x0A | ≥0x00 | ≥0x00 | ≥0x00 | - | Reserved |

ETHERNET DEVICE AND LANE OPERATING METHOD

CROSS REFERENCE TO RELATED APPLICATION

This application claims the benefit under 35 U.S.C. §119 (a) of Korean Patent Application No. 10-2009-0057771, filed on Jun. 26, 2009, the disclosure of which is incorporated by reference in its entirety for all purposes.

BACKGROUND

1. Field

The following description relates to a technology for lane operations of an Ethernet device having a plurality of lanes.

2. Description of the Related Art

The Institute of Electrical and Electronics Engineers (IEEE) has established IEEE 802.3ba in order to aid 40 Gb/s and 100 Gb/s Ethernet communication standardization.

In the format, Draft 2.0 has been introduced, and Draft 2.0 employs a multiple-lane configuration for high-speed transmission over 10 Gb/s.

In the multi-lane configuration, several lanes having relatively lower transmission rates are used in a parallel manner to generate a link with a high-speed transmission rate.

According to Draft 2.0 of IEEE 802.3ba, a 100 Gb/s Ethernet device is capable of processing data to be transmitted from a media access control (MAC) layer to a physical layer at a transmission rate of 100 Gb/s by use of ten electrical lanes each having a transmission rate of 10 Gb/s or four electrical lanes each having a transmission rate of 25 Gb/s in a distributed manner.

SUMMARY

The following description relates to an apparatus and method for selectively using some of multiple lanes when necessary.

In one general aspect, there is provided an Ethernet device having multiple lanes, the Ethernet device including a lane state setting unit to set each lane to either an active or inactive state, and a block distribution unit to distribute data blocks to the respective lanes, and to allocate a dummy block to a lane set to inactive.

In another general aspect, there is provided an Ethernet device having multiple lanes, the Ethernet device including a lane state determination unit to detect a lane which is set to an inactive state and to which a dummy block is allocated, and a block elimination unit to eliminate the dummy block from among genuine data blocks.

In still another general aspect, there is provided a method of operating multiple lanes of Ethernet device, the method including generating a lane status message containing lane state information and transmitting the generated lane status message, setting at least one or more lanes to an inactive state according to the generated lane status message, and distributing data blocks to the respective lanes and allocating a dummy block to each of the lanes set to inactive.

In yet another general aspect, there is provided a method of operating multiple lanes of an Ethernet device, the method including receiving a lane status message containing lane state information, detecting a lane which has been set to an inactive state, and to which a dummy block is allocated, based on the received lane status message, and eliminating the dummy block from among the genuine data blocks.

The lane state setting unit may exchange a lane status message containing lane state information with the lane state determination unit. The lane status message may include information of a lane set to inactive, information about whether to perform a lane pass-on function, and information about a structure of a dummy block. The lane status message may be defined based on a link fault message specified by the Institute of Electrical and Electronics Engineers (IEEE) 802.3 standards.

The lane status message may be processed in a reconciliation sub-layer (RS) of an Ethernet communication protocol layer, and the allocation and process of the dummy block may be processed in a physical coding sub-layer (PCS).

Accordingly, multiple lanes of a high-speed broadband Ethernet device can be selectively and partially operated for a particular purpose. Therefore, operation of an Ethernet device at a slow speed, effective management of array elements for lanes, reduction of energy consumption, and application of various lane error control schemes are achieved. In addition, a structure of a lane status message is based on an message of Ethernet standards, so that the lane status message can be used as a transfer message between remote Ethernet devices to inform of states of the lanes and to enable the performing of various functions.

Other features will become apparent to those skilled in the art from the following detailed description, which, taken in conjunction with the attached drawings, discloses is exemplary embodiments of the invention.

BRIEF DESCRIPTION OF THE DRAWINGS

FIG. 4 is a flowchart illustrating an exemplary lane operating method.

FIG. 5 is a table showing exemplary lane status messages.

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
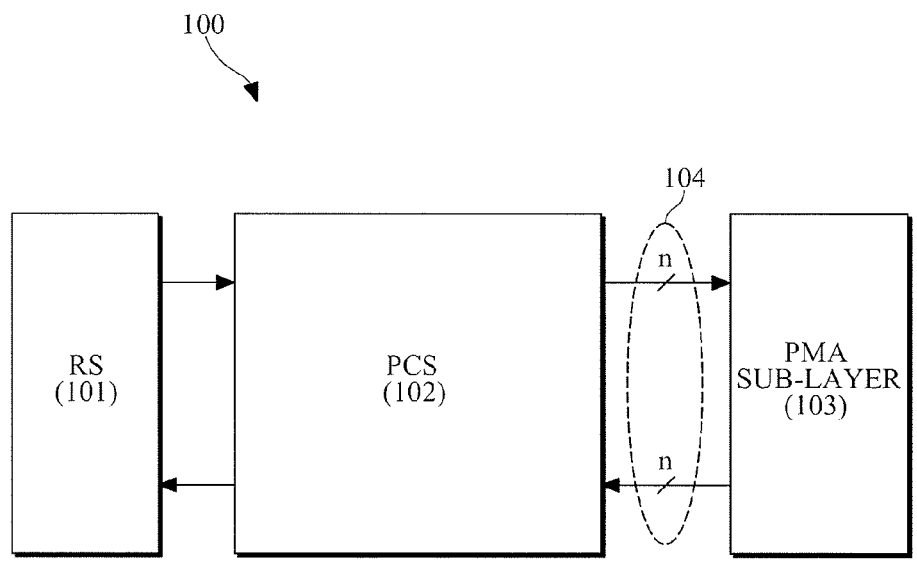
FIG. 1 is a block diagram illustrating a layer structure of an exemplary Ethernet device.

FIG. 1 is a block diagram illustrating a layer structure 100 of an exemplary Ethernet device. Referring to FIG. 1, the layer structure 100 may include a reconciliation sub-layer (RS) 101, a physical coding sub-layer (PCS) 102, and a physical medium attachment (PMA) sub-layer 103.

A media access control (MAC) layer may be present above the RS 101, and a physical media dependent (PMD) sub-layer or a physical layer may be present below the PMA sub-layer 103.

The RS 101 converts a signal for the MAC layer to conduct communication regardless of a type of a physical layer. For example, the RS 101 may convert incoming data into a form that enables the MAC layer to recognize, or convert data received from the MAC layer into a form available to a link according to a type of the link.

The PCS 102 may generate a code block for data transmission and decode a received code block. For example, the PCS 102 may employ 64B/66B block coding to generate a code block and decode a received code block.

The PMA sub-layer 103 may transfer a code block received from the PCS 102 to a physical medium, or transfer a data frame received from a link to the PCS 102.

The exemplary Ethernet device includes multiple lanes for high-speed transmission.

With the introduction of high-speed transmission links such as an optical fiber, a need for increasing processing speed of an end directly in front of a transmission link, for example, the PMA sub-layer 103 or the PMD sub-layer has arisen. However, since the processing speed is limited to match a speed of the transmission link, signal processing needs to be performed in parallel. Parallel signal processing or parallel signal transmission in each layer may be performed on a lane basis.

For example, if ten electrical lanes of 10 Gb/s are formed between the PCS 102 and the PMA sub-layer 103, data with a transmission rate of 100 Gb/s can be processed by the ten lanes in a distributed manner.

In addition, multiple optical lanes may be formed at a rear end of the PMA sub-layer 103 to process data in a distributed fashion.

Furthermore, for a compatible combination of electrical lanes and optical lanes, multiple virtual lanes are defined in the PCS 102 and blocks coded with respect to the virtual lanes may be distributed or combined.

In the exemplary Ethernet device, the lane may be an electrical lane, an optical lane, or a virtual lane. Although electrical lanes 104 are illustrated in FIG. 1, this is only for convenience of explanation, and the type of the lane is not limited thereto.

Figure 2:
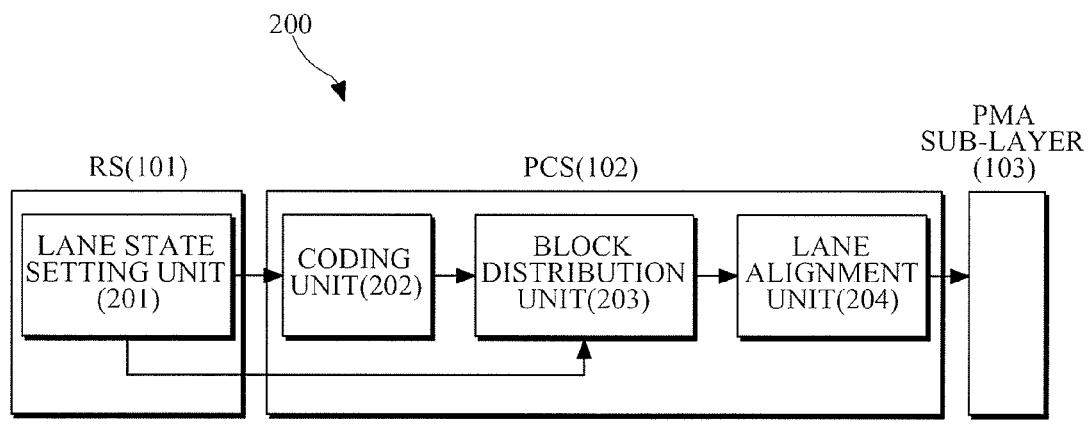
FIG. 2 is a block diagram illustrating an exemplary Ethernet device.

FIG. 2 is a block diagram illustrating an exemplary Ethernet device 200. Referring to FIG. 2, the Ethernet device 200 may include a lane state setting unit 201, a coding unit 202, a block distribution unit 203, and a lane alignment unit 204.

The lane state setting unit 201 sets the state of each lane to either active or inactive. An active lane state is enabled to participate in communication and an inactive lane state means that the lane does not participate in communication.

Which lanes are to be determined to be inactive depends on the purpose of use. For example, the lanes to be inactive may be determined according to purposes such as control of a transmission speed of the Ethernet device, efficient management of arrangement elements forming a lane, reduction of energy consumption, and error control of a lane.

The coding unit 202 receives data from the RS 101, and codes the received data to generate a data block. For example, the coding unit 202 may consist of an encoder that generates a code block of 66 bits from a data block of 64 bits and a scrambler that scrambles bit sequences to have orthogonality in order to reduce voltage recognition error of the bit sequences.

The block distribution unit 203 receives the data block from the coding unit 202. Then, the block distribution unit 203 distributes the received data block to a specific lane. In this case, the block distribution unit 203 receives a control signal from the lane state setting unit 201. The received control signal contains information of a lane set to be inactive. The block distribution unit 203 allocates a dummy block to the inactive lane. The dummy block may be a non-functional block in a predetermined format so that the inactive lane does not participate in communications.

For example, the block distribution unit 203 may distribute the data block to each lane based on a round robin scheme. In this case, before the data block distribution, checking is performed to determine whether a lane to be allocated with a data block is set as inactive. When the lane is set as inactive, a dummy block is allocated to the lane, and otherwise, a data block is allocated.

The lane alignment unit 204 aligns the lanes of which a data block is allocated. To this end, the lane alignment unit 204 may insert an alignment block to a particular lane.

In FIG. 2, the lane state setting unit 201 may be provided in the RS 101. The block distribution unit 203 may be provided in the PCS 102.

The lane state setting unit 201 may use a link fault detection function of the RS 101 to transmit a predetermined lane status message. The lane status message may be based on a link fault message specified by IEEE 802.3 standards, which will be described later.

Figure 3:
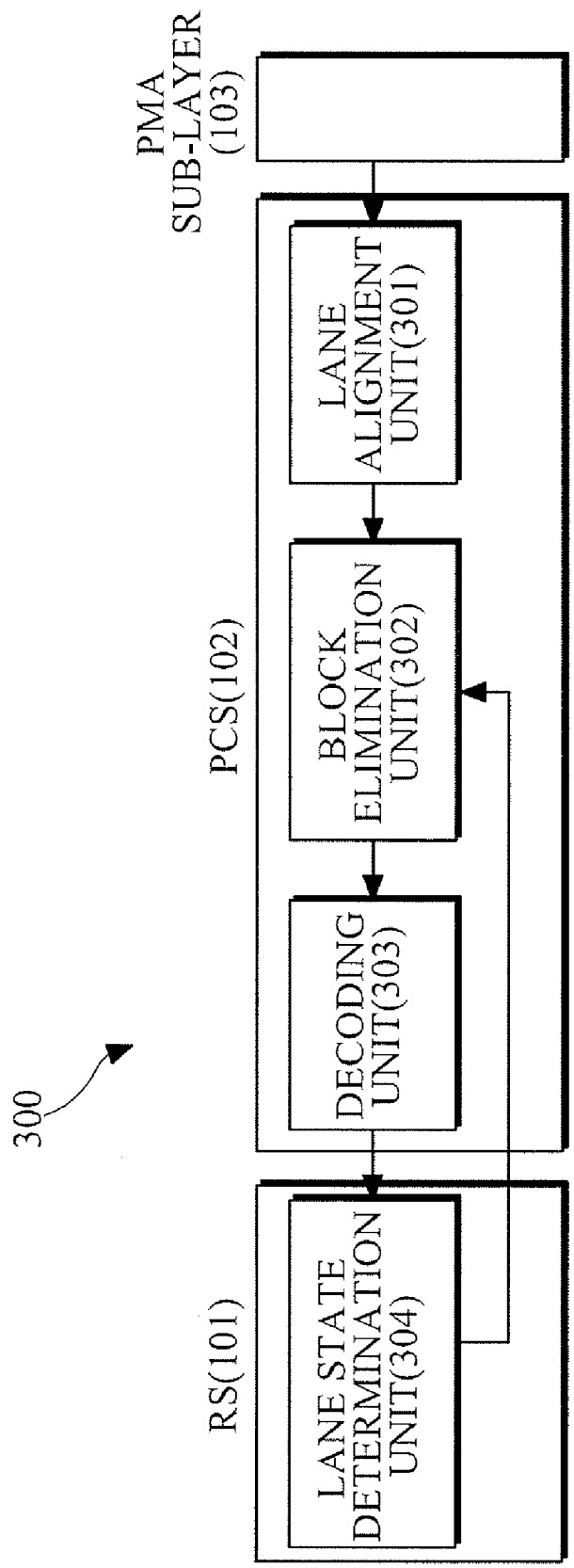
FIG. 3 is a block diagram illustrating another exemplary Ethernet device

FIG. 3 is a block diagram illustrating another exemplary Ethernet device 300. Referring to FIG. 3, the Ethernet device 300 may include a lane alignment unit 301, a block elimination unit 302, a decoding unit 303, and a lane state determination unit 304.

The lane alignment unit 301 may receive data blocks from a PMA sub-layer 103 over multiple lanes. In addition, the lane alignment unit 301 aligns the lanes. For example, the lane alignment unit 301 uses received bit sequences to generate one data block, and buffers the data block to perform lane alignment.

The block elimination unit 302 removes a dummy block from an inactive lane. As described above with reference to FIG. 2, the dummy block may be a non-functional block such that a particular lane is not enabled to participate in communications.

The status of the lane can be determined according to a control signal of the lane state determination unit 304. The lane state determination unit 304 may receive a lane status message including lane state information. The lane status message includes information such as an identifier of a lane set as inactive and data format of the dummy block, and the lane state determination unit 304 may detect an inactive lane to which the dummy block is allocated based on the received lane state information, and inform the block elimination unit 302 of which lanes are inactive.

The block elimination unit 302 transmits all data blocks, not including the dummy block which has been removed to the decoding unit 303, and the decoding unit 303 decodes the data block and transmits the decoded data block to the RS 101.

In FIG. 3, the lane state determination unit 304 may be provided in the RS 101, and the block elimination unit 302 may be provided in the PCS 102.

Hereinafter, it will be described how the Ethernet devices 200 and 300 illustrated in FIGS. 2 and 3 operate multiple lanes during communications.

FIG. 4 is a flowchart illustrating an exemplary lane operating method. In FIG. 4, reference numeral 200 denotes an Ethernet device on a transmission side, and reference numeral 300 denotes an Ethernet device on a receiving side.

At 1001, the Ethernet device 200 on a transmission side transmits a lane status message to the Ethernet device 300 on a receiving side. The lane status message may be processed in the RS 101 (see FIGS. 2 and 3) of each of the Ethernet devices 200 and 300.

The lane status message may contain an identifier (lane_id) of a lane set to be inactive, information (pass_on) notifying that a particular lane will not participate in communications, and information (dummy_str) of a structure of a dummy block. Hereinafter, not allowing a particular lane to participate in communications will be referred to as a "pass on."

At 1002, the Ethernet device 300 on a receiving side, which receives the lane status message, issues a response message as acknowledgement if agreeing with the pass-on.

At 1003, the Ethernet device 200, which has received the response message, on a transmission side sets at least one lane to inactive according to the lane status message. Then, at 1004, the Ethernet device 200 allocates a dummy block to the lane set to inactive.

The Ethernet device 300, which has agreed with the pass-on and transmitted the response message, on a receiving side completes an initial setting based on the lane status message received for the pass-on.

When the Ethernet device 200 on a transmission side, at 1006, transmits data by allocating data blocks including a dummy block to multiple lanes, the Ethernet device 300 on a receiving side, at 1007, detects the inactive lane to which the dummy block is allocated.

It is possible to determine to which lane the dummy block is allocated by use of the lane status message. For example, it is possible to detect an inactive lane based on a lane identifier (lane_id) or a structure of a dummy block (dummy_str), which is included in the lane status message.

The Ethernet device 300, which has detected the inactive lane to which the dummy block has been allocated, on a receiving side, at 1008, eliminates the dummy block, and, at 1009, decodes the data blocks after first eliminating the dummy block therefrom.

Thereafter, at 1010, the Ethernet device 200 on a transmission side, at 1010, transmits a lane status message informing of the termination of pass-on. At 1011, the Ethernet device 300 on a receiving side responds to the lane status message from the Ethernet device 200 such that the pass-on can be terminated.

FIG. 5 is a table showing exemplary lane status messages. Referring to FIG. 5, each of the lane status messages may be transmitted and received using a link fault detection function of an RS layer. For example, a link fault message specified by IEEE 802.3 standards may be expanded to define the lane status messages shown in FIG. 5.

In FIG. 5, Fields 0 to 7 represent a medium independent interface (MII). MII may be an interface between an RS and a PCS sub-layer. The RS and the PCS sub-layer exchange 8-byte data through the MII, and each field may represent one byte. A sequence defined by the standards is written in Field 0, which indicates that a current message is link fault message. In addition, a type of message such as 'local fault' and 'remote fault' may be written in Field 3.

For example, in case of a lane status message related to pass-on, 0x03 may be written in Field 3 and an identifier of a lane set to inactive may be written in Field 7.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An Ethernet device having multiple lanes, the Ethernet device comprising:
 a lane state setting unit to set each lane to either an active or inactive state; and
 a block distribution unit to distribute data blocks to the respective lanes, and to allocate a dummy block to a lane, based on the lane being set to inactive.

2. The Ethernet device of claim 1, wherein the lane state setting unit transmits a lane status message containing lane state information.

3. The Ethernet device of claim 2, wherein the lane status message is defined based on a link fault message specified by the Institute of Electrical and Electronics Engineers (IEEE) 802.3 standards.

4. The Ethernet device of claim 1, wherein the lane state setting unit is formed in a reconciliation sub-layer (RS) and the block distribution unit is formed in a physical coding sub-layer (PCS).

5. The Ethernet device of claim 1, wherein the distribution unit distributes the data blocks to the respective lanes based on a round robin scheme.

6. The Ethernet device of claim 5, wherein before the distribution unit distributes the data blocks, checking is performed to determine whether each lane to be allocated with a data block is set as inactive and allocating the dummy block to each lane that is set to inactive.

7. An Ethernet device having multiple lanes, the Ethernet device comprising:
 a lane state determination unit to detect a lane which is set to an inactive state and to which a dummy block is allocated; and
 a block elimination unit to eliminate the dummy block.

8. The Ethernet device of claim 7, wherein the lane state determination unit receives a lane status message containing lane state information and determines a state of the lane based on the received lane status message.

9. The Ethernet device of claim 8, wherein the lane status message is defined based on a link fault message specified by IEEE 802.3 standards.

10. The Ethernet device of claim 8, wherein the determination unit detects the inactive lane based on a lane identifier included in the lane status message.

11. The Ethernet device of claim 8, wherein the determination unit detects the inactive lane based on a data format of the dummy block included in the lane status message.

12. The Ethernet device of claim 7, wherein the lane state determination unit is formed in a reconciliation sub-layer (RS) and the block elimination unit is formed in a physical coding sub-layer (PCS).

13. The Ethernet device of claim 7, wherein the block elimination unit transmits all data blocks, not including the dummy block, which is removed to a decoding unit and the decoding unit decodes the data blocks and transmits the decoded data to a reconciliation sub-layer (RS).

14. A method of operating multiple lanes of Ethernet device, the method comprising:
  generating a lane status message containing lane state information and transmitting the generated lane status message;
  setting at least one or more lanes to an inactive state according to the generated lane status message; and
  distributing data blocks to the respective lanes and allocating a dummy block to each of the lanes set to inactive.

15. The method of claim 14, wherein the lane status message is processed in a reconciliation sub-layer (RS) of the Ethernet device.

16. The method of claim 15, wherein the lane status message is defined based on a link fault message specified by IEEE 802.3 standards.

17. A method of operating multiple lanes of an Ethernet device, the method comprising:
  receiving a lane status message containing lane state information;
  detecting a lane set to an inactive state, to which a dummy block is allocated, based on the received lane status message; and
  eliminating the dummy block.

18. The method of claim 17, wherein the lane status message is processed in a reconciliation sub-layer (RS) of the Ethernet device.

19. The method of claim 17, wherein the lane status message is defined based on a link fault message specified by IEEE 802.3 standards.

* * * * *